Feb. 4, 1930.        A. TAICHER        1,745,562
WHEELED CARRIAGE
Filed April 30, 1928
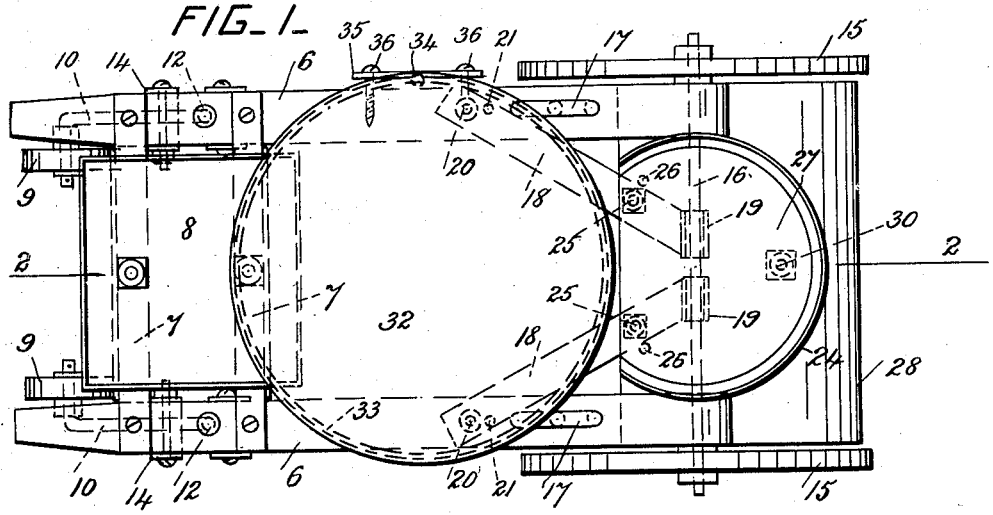
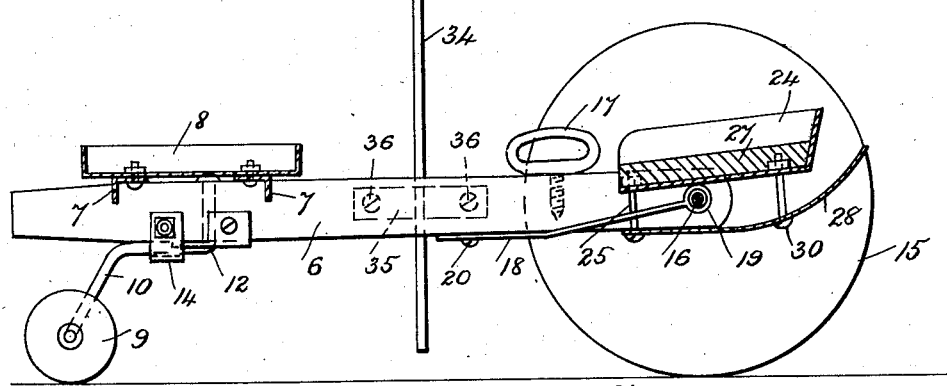
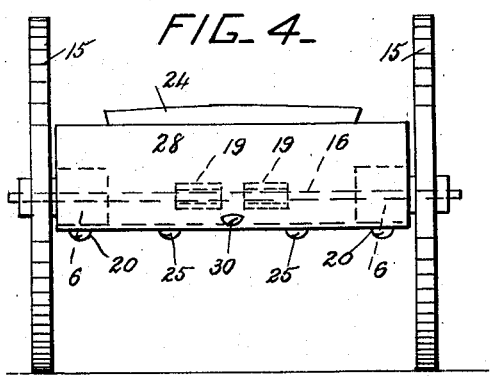
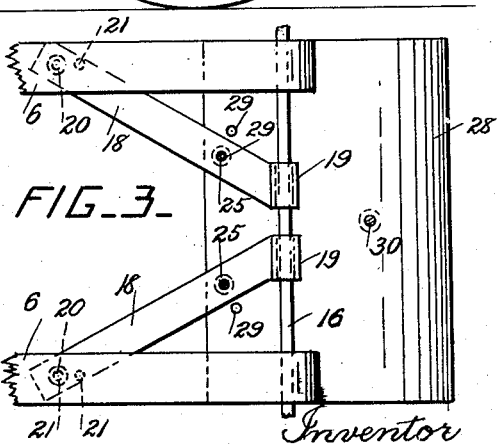
Inventor
Adolph Taicher
by Hubert W. Jenner
attorney.

Patented Feb. 4, 1930

1,745,562

UNITED STATES PATENT OFFICE

ADOLPH TAICHER, OF MANITOWOC, WISCONSIN

WHEELED CARRIAGE

Application filed April 30, 1928. Serial No. 273,934.

This invention relates to wheeled carriages specially adapted for use in gathering low growing crops, such as strawberries or beets; and it consists in the novel construction and combination of the parts hereinafter fully described and claimed which support the operator in close proximity to the ground and enable him to harvest the crop without stooping.

In the drawings, Fig. 1 is a plan view of a carriage constructed according to this invention. Fig. 2 is a longitudinal section taken on the line 2—2 in Fig. 1. Fig. 3 is a plan view of one end portion of the frame with the seat removed. Fig. 4 is an end view of the carriage.

The frame of the carriage is provided with two longitudinal side bars 6 having two crossbars 7 secured between their front end portions. A tray 8 is secured to these crossbars, for the reception of a basket or other device for holding the crop when gathered. Caster wheels 9 supported by arms 10 are arranged under the front end portion of the frame, and the arms have vertical pivots 12 pivoted in the frame, and are provided with stop brackets 14 to limit the lateral movements of the wheels.

Ground wheels 15 are mounted on the end portions of an axle 16 secured in the other end portions of the side bars 6, and the side bars are provided with handles 17 secured to them at any convenient points. These handles enable the carriage to be lifted about from one row of plants to another, and placed so that the plants are between the ground wheels. Two diagonal braces are provided and these braces 18 have eyes or loops 19 which engage loosely with the middle part of the axle. The front end portions of the braces are secured to the side bars by screws or bolts 20 which engage with holes 21 in the side bars so that the positions of the braces can be varied.

A seat frame 24 for the operator is secured to the braces 18 by bolts 25 at its front part, and its rear part is supported by the eyes and the axle. The seat frame has a plurality of bolt holes 26 so that its position can be adjusted longitudinally in the carriage. When the eyes are moved farther apart on the axle, and the seat is moved a little more to the rear than shown in the drawings, the weight of the operator is moved a little to the rear, and there is less down pressure on the caster wheels. A seat or cushion 27 for the operator is arranged in the seat frame over the bolts.

A spring guard plate 28 is also secured to the braces by the bolts 25, and has a plurality of bolt holes 29, corresponding with the bolt holes in the seat frame. This guard plate has its rear end portion curved upwardly and arranged to project beyond the seat frame. The rear end of the plate 28 is supported by a bolt 30 which engages with the seat frame, and which permits the guard plate to spring upwardly to a slight extent at its rear part.

A canopy 32 for the operator is provided, and consists of any suitable fabric supported on a frame 33. The frame 33 is preferably a wire ring, and it has an upright 34 at one side which is engaged by a spring clamping plate 35 secured to one of the side bars by screws 36. The upright is adjusted vertically and pivotally in the space between the plate 35 and the side bar, and the latter has a shallow groove to receive the upright. The screws are adjusted so that the canopy is held in position, and can be moved pivotally with facility to accommodate the operator and permit him to get into and out of his seat.

The operator gets into his seat, and then turns the upright pivotally by handles 37 which project from it, so that the canopy affords the desired shelter.

The operator is supported by the seat in close proximity to the plants so that he can gather the crop without stooping, and he moves the carriage along the row of plants from time to time as he gathers the crop, by pushing with his heels on the ground, so that the carriage is propelled rearwardly. The guard plate deflects portions of the plants, and prevents them from getting caught between the axle, seat frame and braces.

What I claim is:

1. A carriage comprising a wheeled frame provided with an axle and a seat arranged over the axle, and a spring guard plate having its front part secured to the frame, said guard plate being arranged under the said axle and seat, and means for supporting the rear part of the guard plate from the seat and permitting it to spring upwardly.

2. A carriage comprising a wheeled frame provided with side bars and an axle, diagonal braces having their front ends adjustably connected to the side bars and their rear ends slidable laterally on the axle, and a seat supported by the said braces and axle an adjustable with the braces longitudinally of the frame.

3. A carriage comprising a frame having parallel side bars, an axle provided with wheels and mounted in the side bars, a seat arranged over the said axle, and a curved spring guard plate having its front part secured against the undersides of the said side bars with its curved rear part projecting upwardly above the level of the axle and the bottom of the seat.

4. A carriage comprising a frame having parallel side bars, an axle provided with wheels and mounted in the side bars, a longitudinally adjustable seat resting on the said axle, and diagonal braces secured between the seat and the side bars to hold the seat in various positions.

In testimony whereof I have affixed my signature.

ADOLPH TAICHER.